United States Patent
Parihar et al.

(10) Patent No.: US 11,546,792 B1
(45) Date of Patent: Jan. 3, 2023

(54) DYNAMIC CONTROL OF SPLIT-UPLINK-MODE OPERATION TO HELP FACILITATE RESOURCE AVAILABILITY FOR UES SERVED WITHOUT SPLIT UPLINK

(71) Applicant: Sprint Spectrum L.P., Overland Park, KS (US)

(72) Inventors: Vanil Parihar, Overland Park, KS (US); Sreekar Marupaduga, Overland Park, KS (US); Rashmi Kumar, Herndon, VA (US)

(73) Assignee: SPRINT SPECTRUM LP, Overland Park, KS (US)

( * ) Notice: Subject to any disclaimer, the term of this patent is extended or adjusted under 35 U.S.C. 154(b) by 0 days.

(21) Appl. No.: 17/249,056

(22) Filed: Feb. 18, 2021

(51) Int. Cl.
  *H04W 28/02* (2009.01)
  *H04W 76/16* (2018.01)
  (Continued)

(52) U.S. Cl.
  CPC ....... *H04W 28/0205* (2013.01); *H04W 48/16* (2013.01); *H04W 76/16* (2018.02); *H04W 88/06* (2013.01); *H04W 88/08* (2013.01)

(58) Field of Classification Search
  CPC .............. H04W 28/085; H04W 28/08; H04W 36/00834; H04W 36/0069;
  (Continued)

(56) References Cited

U.S. PATENT DOCUMENTS 8,185,060 B2   5/2012   Agashe et al.
8,285,321 B2   10/2012  Ji et al.
(Continued)

FOREIGN PATENT DOCUMENTS

WO   WO-2013097908 A1 *  7/2013  ........ H04W 72/0433
WO   WO-2020198692 A1 *  10/2020  .......... H04W 56/001

OTHER PUBLICATIONS

E. Pateromichelakis et al., "Service-Tailored User-Plane Design Framework and Architecture Considerations in 5G Radio Access Networks," in IEEE Access, vol. 5, pp. 17089-17105, Aug. 2017, doi: 10.1109/ACCESS.2017.2736579. (Year: 2017).*

(Continued)

*Primary Examiner* — William D Cumming (57) ABSTRACT

A method and system for controlling application of split-uplink mode in a wireless communication system including an access node. In an example implementation, a method includes determining a first count defining how many user equipment devices (UEs) are connected with the access node and do not support a split-uplink-mode operation in which uplink user-plane data flow is split between air-interface transmission to the access node and air-interface transmission to another access node. Further, the method includes determining a second count defining how many UEs are connected with the access node as part of dual connectivity and support the split-uplink-mode operation. And the method includes, based on the first count and the second count, controlling whether the access node will allow the split-uplink-mode operation, such as whether the access node will allow new activation of the split-uplink-mode operation.

20 Claims, 5 Drawing Sheets

(51) Int. Cl.
  *H04W 88/06* (2009.01)
  *H04W 48/16* (2009.01)
  *H04W 88/08* (2009.01)

(58) Field of Classification Search
  CPC ............. H04W 52/0261; H04W 24/08; H04W 56/001; H04W 48/20; H04W 12/106; H04W 12/367; H04W 52/20; H04W 76/16
  See application file for complete search history.

(56) References Cited

U.S. PATENT DOCUMENTS

| | | | |
|---|---|---|---|
| 9,392,515 B2 | 7/2016 | Wang et al. | |
| 9,699,800 B2 | 7/2017 | Himayat et al. | |
| 10,104,584 B2 | 10/2018 | Cai | |
| 10,141,983 B2 | 11/2018 | Kim et al. | |
| 10,237,735 B2 | 3/2019 | Kim et al. | |
| 10,292,140 B2 | 5/2019 | Nam et al. | |
| 10,314,055 B1 | 6/2019 | Marupaduga et al. | |
| 10,912,031 B2 * | 2/2021 | Kim | H04W 48/20 |
| 11,032,702 B2 * | 6/2021 | Kim | H04W 12/033 |
| 11,265,945 B1 * | 3/2022 | Marupaduga | H04W 24/08 |
| 11,277,797 B1 * | 3/2022 | Marupaduga | H04W 52/0261 |
| 2015/0085800 A1 | 3/2015 | Sivanesan et al. | |
| 2016/0234714 A1 | 8/2016 | Basu Mallick et al. | |
| 2017/0111911 A1 | 4/2017 | Uchino et al. | |
| 2017/0272364 A1 * | 9/2017 | Ishii | H04L 47/12 |
| 2019/0098606 A1 * | 3/2019 | Sharma | H04W 76/15 |
| 2019/0387440 A1 * | 12/2019 | Yiu | H04W 36/165 |
| 2020/0344629 A1 * | 10/2020 | Kim | H04W 52/0209 |
| 2021/0022032 A1 * | 1/2021 | Kim | H04W 76/16 |
| 2021/0297854 A1 * | 9/2021 | Kim | H04W 12/106 |
| 2022/0046554 A1 * | 2/2022 | Marupaduga | H04W 52/367 |

OTHER PUBLICATIONS

D. Mahmoud, A. B. Tóth, E. Kail and A. Bánáti, "5G Vulnarabilities from Security Operation Center's Perspective," 2021 IEEE 21st International Symposium on Computational Intelligence and Informatics (CINTI), 2021, pp. 000229-000234, doi: 10.1109/CINTI53070.2021.9668348. (Year: 2021).*

Tariq Mumtaz, et al., "Dual Connectivity-Based Mobility Management and Data Split Mechanism in 4G/5G Cellular Networks," IEEE Access, vol. 8, May 20, 2020.

* cited by examiner

DYNAMIC CONTROL OF SPLIT-UPLINK-MODE OPERATION TO HELP FACILITATE RESOURCE AVAILABILITY FOR UES SERVED WITHOUT SPLIT UPLINK

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency.

Further, on the downlink and uplink channels, the coverage of each access node could define an air interface configured in a specific manner to define physical resources for carrying information wirelessly between the access node and UEs.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could function to carry synchronization signals that UEs could detect as an indication of the presence of coverage and to establish frame timing, those or other resource elements could function to carry a reference signal that UEs could measure in order to determine coverage strength, and still other resource elements could function to carry other control signaling such as PRB-scheduling directives and acknowledgement messaging from the access node to served UEs. And on the uplink, certain resource elements could function to carry random access signaling from UEs to the access node, and other resource elements could function to carry other control signaling such as PRB-scheduling requests and acknowledgement signaling from UEs to the access node.

OVERVIEW

When a UE enters into coverage of such a system, the UE could detect threshold strong coverage of an access node (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE. Further, if the UE is not already registered for service, the UE could engage in attach signaling via the access node with a core-network controller, to attach and thus register for service.

Upon initial attachment and/or at other times when serving a UE, the system could also coordinate setup for the UE of one or more user-plane bearers, each defining a logical packet flow for packet-data communications between the UE and a core-network gateway system that provides connectivity transport network connectivity. For instance, after authenticating and authorizing the UE, the core-network controller could engage in signaling with the access node and with the gateway system, to coordinate setup of each such bearer, including a radio-bearer portion extending between the UE and the access node and an access-bearer portion extending between the access node and the gateway system.

Each such bearer could support communication between the UE and the gateway system and thus ultimately between the UE and the transport network with which the gateway system provides connectivity. When data on the transport network arrives at the gateway system for transmission to the UE, the data could then flow over a bearer from the gateway system to the access node and from the access node to the UE. And when the UE has data to transmit on the transport network, the data could flow over a bearer from the UE to access node and from the access node to the gateway system for output onto the transport network.

Further, for the air-interface portion of each such transmission, the access node could coordinate allocation of air-interface resources to carry the data between the access node and the UE. With the example air-interface configuration noted above, for instance when the access node has data to transmit to the UE, the access node could allocate one or more downlink PRBs in an upcoming subframe for carrying a block of the data to the UE and could then transmit the data to the UE in the allocated PRB(s). And when the UE has data to transmit to the access node, the UE could transmit to the access node a buffer status report (BSR) indicating how much data the UE has buffered for transmission, the access node could allocate one or more uplink PRB(s) in an upcoming subframe for carrying a block of that data from the UE, and the UE could then transmit the data to the access node in the allocated PRB(s).

When the industry advances from one generation of wireless technology to the next, or in other scenarios, networks and UEs may also support dual-connectivity service, where a UE is served on co-existing connections, perhaps according to multiple different RATs.

For instance, a first access node could provide service according to a first RAT and a second access node could provide service according to a second RAT, and certain UEs positioned concurrently within coverage of both the first and second access nodes could have a first radio configured to engage in service according to the first RAT and a second radio configured to engage in service according to the second RAT. With this arrangement, such a UE within coverage of both access nodes may be able to establish a first air-interface connection with the first access node according to the first RAT and a second air-interface connection with the second access node according to the second RAT, and the access nodes may then concurrently serve the UE over those connections as noted above, each according to its respective RAT.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection (as "standalone" connectivity).

In a representative dual-connectivity implementation, the first access node operating according to the first RAT ("first-RAT access node) could function as a primary access node or master node (MN), responsible for coordinating setup and teardown of dual-connectivity service for the UE and functioning as an anchor point for key RRC signaling and core-network control signaling related to the dual-connected UE. And the second access node operating according to the second RAT ("second-RAT access node") could function as a secondary access node or secondary node (SN) mainly to provide additional connectivity and increased aggregate bandwidth for the UE.

In such an implementation, when the UE first enters into network coverage, the UE could scan for coverage on the first RAT and could discover threshold strong coverage of the first-RAT access node and responsively establish a first connection between the UE and the first-RAT access node ("first-RAT connection") as discussed above, and the UE could attach with the core network if appropriate. The first-RAT access node could then serve the UE in a first-RAT standalone mode (i.e., under just the first RAT) with packet-data communications as described above for instance.

In relation to the UE's attachment, and/or at another time, the first-RAT access node could also receive from the UE or the core-network controller a capability report that indicates various capabilities of the UE, including for instance whether the UE is dual-connectivity capable. If the UE is dual-connectivity capable, the first-RAT access node could then trigger and/or engage in a process to establish for the UE a second connection between the UE and a second-RAT access node ("second-RAT connection"), so that the first-RAT access node and second-RAT access node can then cooperatively provide the UE with dual-connectivity service.

In an example of this process, the MN could first identify an SN with which to establish the second-RAT connection for the UE, perhaps based on the UE reporting that the UE is within threshold strong coverage of the SN or based on an assumption (in some situations) that the UE being in coverage of the MN means the UE is likely also in coverage of the SN.

Further, the MN could then engage in an SN-addition process to add for the UE a second-RAT connection with the SN. For instance, the MN could transmit over an X2 interface or other inter-access-node interface to the SN an SN-addition request message, providing RRC configuration information and/or other information for the second-RAT connection, and the SN could then responsively allocate resources for the second-RAT connection and reply to the MN with an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then transmit a random-access signal to the SN, and the SN could respond to the UE with a random-access response message, which could complete establishment of the second-RAT connection for the UE.

In addition, for some dual-connectivity implementations, the MN could also engage in signaling process to transfer the access-bearer portion of one or more of the UE's bearer(s) from being between the gateway system and the MN to instead being between the gateway system and the SN. For instance, the MN could include in its SN-addition request to the SN information about the access bearer, and the MN could transmit to the core-network controller a bearer modification request and the core-network controller could update the gateway system so as to transfer the access-bearer from the MN to the SN.

With dual-connectivity so configured by way of example, the MN and SN could then serve the UE with packet-data communications over their respective connections with the UE, with each access node coordinating air-interface communication in the manner described above.

In an example dual-connectivity implementation, downlink user-plane data flow would be split between the UE's two connections. For instance, when the gateway system receives data destined to the UE, that data could flow over a UE bearer from the gateway system to the SN, and the SN and MN could then share transmission of that data to the UE. Namely, the SN could send a portion of the data over an X2 interface or the like to the MN, and the MN could schedule and provide transmission of that portion of data to the UE on one or more downlink PRBs of the UE's first-RAT connection. And the SN could itself schedule and provide transmission of another portion of the data to the UE on one or more downlink PRBs of the UE's second-RAT connection.

But in the example implementation, uplink user-plane data flow may or may not be split between the UE's two connections. In particular, the system could support serving the dual-connected UE in either a "single-connection-uplink mode" or a "split-uplink mode".

In the single-connection-uplink mode, the UE's uplink data flow would be limited to just one of the UE's two connections. Thus, when the UE has data to transmit, the UE could send a scheduling request to just the access node providing that one connection, the access node could schedule transmission of the data from the UE on PRBs of that connection as noted above, the UE could accordingly transmit the data on the PRBs as scheduled, and the data could flow over a UE bearer to the gateway system.

Whereas, in the split-uplink mode, the UE's uplink data flow would be split between the UE's two connections, perhaps when there is or will be sufficient uplink data flow from the UE to justify doing so. Thus, when the UE has data to transmit, the UE could send to the MN a scheduling request for transmission of a portion of the data, the MN could schedule transmission of that portion of the data from the UE on one or more uplink PRBs of the UE's first-RAT connection, the UE could accordingly transmit that portion of the data over the air to the MN as scheduled, the MN could then forward that portion of the data to the SN, and that portion of data could flow over a UE bearer from the SN to the gateway system. And the UE could also send to the SN a scheduling request for transmission of another portion of the data, the SN could schedule transmission of that other portion of the data from the UE on one or more uplink PRBs of the UE's second-RAT connection, the UE could accordingly transmit that other portion of the data over the air to the SN as scheduled, and that other portion of data as well could flow over a UE bearer to the gateway system.

In an example system, when an MN serves a UE as part of dual connectivity, the MN could control whether or not the UE will operate in the split-uplink mode. For instance, the MN could first determine from the UE's capability data whether the UE supports operation in the split-uplink mode. And if so, the MN may could then transmit to the UE an RRC message that carries a directive to activate split-uplink-mode, and the UE could responsively set itself to operate in the split-uplink mode and could operate accordingly. Further, the MN could also deactivate a UE's operation in the uplink-split mode by transmitting to the UE an RRC message carrying a directive to deactivate split-uplink mode, and the UE could respond to that message by setting itself to operate in the single-connection-uplink mode and could operate accordingly.

One technical issue that arise in such a system is that the MN's serving of dual-connected UEs that operate in the split-uplink mode could result in air-interface resource limitations for UEs that the MN serves in the single-connection-uplink mode.

This issue could arise in an implementation where, when the MN serves at least one dual-connected UE with split-uplink mode activated, the MN would reserve a portion of the uplink PRBs of the MN's air interface for use by such UE(s), to help ensure that the MN has sufficient such uplink PRBs available to help provide each such UE with a high level of uplink throughput expected with split-uplink mode. Although that resource reservation may benefit dual-connected UEs that operate with split-uplink mode, the resource reservation would limit resource availability for other UEs, including, for instance, UEs that the MN serves with standalone first-RAT service (i.e., not dual-connectivity) and UEs that the MN serves with dual-connectivity service but that operate in the single-connection-uplink mode (e.g., dual-connected UEs that do not support the split-uplink mode). This could be the case especially at times when the uplink of the MN's air interface if heavily loaded (e.g., with high uplink PRB utilization.)

The present disclosure provides a technical mechanism that may help to address this issue. In accordance with the disclosure, an access node will dynamically control whether or not the access node would allow use of split-uplink mode, basing the control on a consideration of (A) the number of UEs that are connected with the access node and do not support split-uplink mode, such as UEs that have standalone connectivity with the access node and/or UEs that are served by the access node as part of dual connectivity but that do not support split-uplink mode, and (B) the number UEs that are connected with the access node as part of dual connectivity and that support split-uplink mode.

In practice, this access node could have two different modes of operation, a split-uplink-mode enabled mode in which the access node allows use of split-uplink mode (e.g., allows activation of split-uplink mode), and a split-uplink-mode disabled mode in which the access node does not allow use of split-uplink mode (does not allow activation of split-uplink mode). And the access node could control which of these two modes the access node will operate in, with the control being based on whether both (i) there are threshold many UEs that are connected with the access node and that do not support split-uplink mode and (ii) there are threshold few UEs that are connected with the access node as part of dual-connectivity and that support split-uplink mode. If and when both of these conditions are met, the access node could responsively operate in the split-uplink-mode disabled mode. Whereas, if and when either or each of these conditions is not met, the access node could responsively operate in the split-uplink mode enabled mode.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

Figure 1:
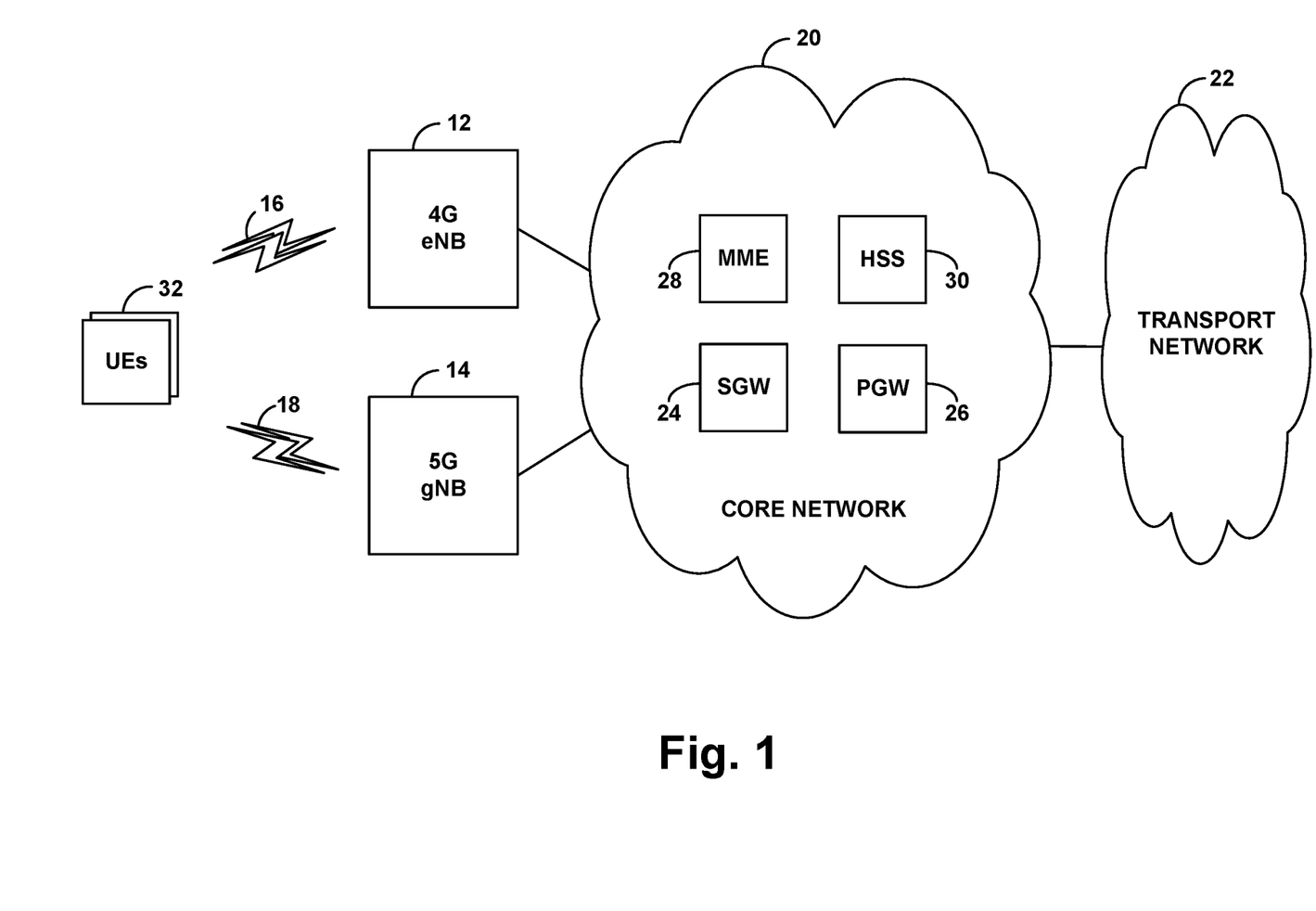
FIG. 1 is a simplified block diagram of an example network arrangement in which features of the present disclosure can be implemented.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations Referring to the drawings, FIG. 1 is a simplified block diagram of an example network arrangement having a 4G eNB 12 and a 5G gNB 14. Each of these access nodes could be macro access nodes of the type configured to provide a wide range of coverage or could take other forms, such as a small cell access node, a relay, a femtocell access node, or the like, possibly configured to provide a smaller range of coverage. Further, the access nodes could be collocated with each other, e.g., at a common cell site with collocated RF points of origin, or could be separately located. Either way, the access nodes could be optimally configured to provide overlapping coverage in order to support EN-DC service.

Each of these access nodes could also be configured to provide coverage and service on one or more carriers, with the access node's coverage on a given carrier defining a respective cell as noted above. In the example shown, for instance, the 4G eNB 12 is configured to provide coverage and service on one or more 4G carriers defining 4G cells 16, and the 5G gNB 14 is configured to provide coverage and service on one or more 5G carriers defining 5G cells 18. Further, in some cases, the access nodes could be configured to share use of one or more carriers.

Each such carrier could be defined in a given frequency band and could be FDD or TDD. And each carrier could have a respective frequency bandwidth on its downlink and/or uplink. For instance, an FDD carrier could have a respective downlink frequency bandwidth and a respective uplink frequency bandwidth. Whereas, a TDD carrier could have a single channel bandwidth for both downlink and uplink, though the downlink-uplink configuration of the TDD carrier could alternatively be considered to scale down the bandwidth of the carrier respectively on the downlink and uplink based on what percentage of time the carrier is downlink versus uplink.

Further, the air interface on each such channel could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown in FIG. 1, each of the illustrated access nodes is interfaced with an example core network 20, which provides connectivity with an external transport network 22 such as the Internet for instance. This core network could be a packet-switched network such as an Evolved Packet Core (EPC) network or Next Generation Core (NGC) core network, among other possibilities, supporting virtual-packet tunnels or other interfaces between network nodes. And the core network could include both a user-plane subsystem through which UE bearer communications could flow to and from the transport network 22, and a control-plane subsystem supporting functions such as UE authentication, mobility management, and bearer management, among others.

In the example arrangement as shown, for instance, the core network 20 could be an EPC network including a serving gateway (SGW) 24, a packet data network gateway (PGW) 26, a mobility management entity (MME) 28, and a home subscriber server (HSS) 30, although other arrangements are possible as well. With this arrangement, the 4G eNB 12 and 5G gNB 14 could each have an interface with the SGW 24, the SGW 24 could have an interface with the PGW 26, and the PGW 26 could provide connectivity with the transport network 22. Further, the 4G eNB 12 could have interfaces with the 5G gNB 14 and with the MME 28, and the MME 28 could have an interface with the SGW 24, to facilitate bearer setup and the like. And still further, the HSS 30 could store or have access to UE profile records, which could specify service-subscription plans, UE configurations, and/or other such UE capability information, such as whether a UE is EN-DC capable and whether a UE supports split-uplink mode, for instance.

FIG. 1 also depicts example UEs 32 within coverage of the illustrated access nodes. Each of these UEs could take any of the forms noted above, among other possibilities. If a UE supports EN-DC, then the UE may be equipped with a 4G LTE radio and a 5G NR radio, as well as associated circuitry and logic to support 4G LTE service, 5G NR service, and EN-DC service. Whereas, if the UE does not support EN-DC but supports just 4G LTE service, then the UE may be equipped with a 4G LTE radio but might not be equipped with a 5G NR radio.

Upon entering into coverage this example system, each such UE could scan for 4G coverage and could discover threshold strong coverage of a representative 4G cell 16 provided by 4G eNB 12. In line with the discussion above, the UE could then responsively engage in random access and RRC signaling with the 4G eNB 12 to establish a 4G connection between the UE and the 4G eNB 12 in that 4G cell. Further, the 4G eNB 12 may add one or more other 4G cells 16 to the UE's 4G connection to provide the UE with 4G carrier-aggregation service. And the 4G eNB 12 could establish in data storage a context record for the UE as noted above.

Once the UE is connected with the 4G eNB 12, the UE could then send to the 4G eNB 12 an attach request message, which the 4G eNB 12 could forward to the MME 28 for processing. And upon authenticating and authorizing the UE for service, the MME 28 and 4G eNB 12 could coordinate setup for the UE of at least one user-plane bearer. For instance, the MME 28 could engage in signaling with the 4G eNB 12 and the SGW 24 to coordinate setup for the UE of an S1-U packet tunnel between the 4G eNB 12 and the SGW 24, and the SGW 24 could responsively engage in signaling with the PGW 26 to coordinate setup for the UE of an associated S5 packet tunnel between the SGW 24 and the PGW 26. Further, the 4G eNB 12 could engage in signaling with the UE to establish for the UE an associated data radio bearer.

In addition, in relation to the UE's connection and/or attachment or at another time, the 4G eNB 12 could obtain capability data that indicates various capabilities of the UE, including an indication of whether the UE supports EN-DC service and an indication of whether the UE supports split-uplink mode. For instance, the 4G eNB 12 could obtain this capability data from the UE, or the 4G eNB 12 could obtain this capability data from the MME 28, which could obtain the data from the HSS 30. And the 4G eNB 12 could store this capability data in the UE context record for reference.

If the UE is not EN-DC capable, then the 4G eNB 12 would not establish EN-DC service for the UE but would rather serve the UE in a standalone 4G mode. In this mode, the UE's downlink and uplink user-plane communication would occur over the UE's 4G connection with the 4G eNB. Thus, when the 4G eNB 12 receives data for transmission to the UE, the 4G eNB 12 could schedule and engage in transmission of the data in downlink PRBs from the 4G eNB 12 to the UE. And when the UE has data to transmit, the UE could send a scheduling request to the 4G eNB 12, and 4G eNB 12 could schedule and the UE could engage in transmission of the data in uplink PRBs from the UE to the 4G eNB 12.

On the other hand, if the UE is EN-DC capable, and perhaps responsive to one or more other trigger conditions as well, the 4G eNB 12 could work to establish EN-DC service for the UE, so that the 4G eNB 12 could then serve the UE as part of EN-DC.

For instance, first the 4G eNB 12 could first direct the UE to scan for 5G coverage, such as by transmitting to the UE an RRC message carrying a "B1" (inter-RAT) measurement object that specifies one or more of the 5G cells 18 provided by the 5G gNB 14 and that specifies per 5G cell a B1 threshold—i.e., an RSRP threshold for deeming 5G coverage of the cell to be sufficiently strong to justify adding secondary connectivity for the UE. And the UE could accordingly scan for 5G coverage and detect threshold strong coverage of one or more such 5G cells 18 and could accordingly transmit to the 4G eNB 12 a B1 measurement report specifying, for each threshold strong 5G cell, an identify of the cell and the threshold strong RSRP that the UE detected from the 5G gNB 14 in the cell.

Operating as the UE's MN (master eNB (MeNB)), the 4G eNB 12 could then engage in signaling to coordinate establishment for the UE of a secondary 5G connection with the 5G gNB 14, as the UE's SN (secondary gNB (SgNB)) on the one or more detected/reported 5G cells 18. For example, the 4G eNB 12 could transmit to the 5G gNB 14 an SgNB-Addition request to cause the 5G gNB 14 to allocate resources for a 5G connection for the UE on the one or more 5G cells 18, the 4G eNB 12 could receive an SgNB-Addition-Request acknowledge message from the 5G gNB 14, and the 4G eNB 12 could engage in associated RRC signaling with the UE, in response to which the UE could then access and complete establishment of the 5G connection. Further, the 4G eNB 12 could add to the UE's context record an indication of the 5G cell(s) on which the UE is then connected with the 5G gNB 14. And the 4G eNB 12 could engage in signaling to establish a split bearer, such as to transfer the UE's access bearer (e.g., the UE's S1-U tunnel) to the 5G gNB 14 and to arrange for a bearer split at the 5G gNB 14, among other possibilities. Further, the 4G eNB 12 could record in the UE's context record an indication that the UE is currently EN-DC-connected, as opposed to being standalone-4G connected.

With EN-DC service configured for the UE, the 4G eNB 12 and 5G gNB 14 could then cooperatively provide the UE with EN-DC service, by concurrently serving the UE, each over its respective connection with the UE and each in the manner discussed above for instance. By way of example, when either access node receives data for transmission to the UE over the UE's connection with the access node, the access node could schedule and engage in transmission of the data in downlink PRBs from the access node to the UE. And when the UE has data to transmit to either access node over the UE's connection with the access node, the access node could schedule and the UE could engage in transmission of the data in uplink PRBs from the UE to the access node.

In line with the discussion above, for each such EN-DC-connected UE, downlink user-plane data flow could be split between the UE's 4G connection with the 4G eNB 12 and the UE's 5G connection with the 5G gNB 14. For instance, when user-plane data arrives from the transport network 22 for transmission to the UE, that data may flow over a split access bearer, and the 4G eNB 12 may transmit a portion of the data over the UE's 4G connection to the UE, while the 5G gNB 14 may transmit another portion of the data over the UE's 5G connection to the UE.

As to the uplink, however, each EN-DC-connected UE may or may not support and operate in the split-uplink mode, and thus the MN may or may not active the UE's operation in split-uplink mode.

If the EN-DC-connected UE does not support operation in the split-uplink mode, then the MN would of course not activate the UE's operation in split-uplink mode, and the UE could operate instead in the single-connection-uplink mode, restricting the UE's uplink user-plane communication to the UE's 4G connection with the 4G eNB 12. Thus, when the UE has user-plane data to transmit to the transport network 22, the UE could send one or more scheduling requests to the 4G eNB 12, the 4G eNB 12 could allocate uplink PRBs of the 4G eNB's air interface to carry the data from the UE, the UE could transmit the data on the allocated PRBs to the 4G eNB 12, and data could then flow from the 4G eNB 12 (e.g., via the 5G gNB 14) over an access bearer for transmission through the core network 20 to the transport network 22.

Whereas, if the EN-DC-connected UE supports operation in the split-uplink mode, then the 4G eNB 12 could activate the UE's operation in split-uplink mode. For instance, the 4G eNB 12 may transmit to the UE an RRC message (perhaps as part of the EN-DC setup process) that directs the UE to operate in the split-uplink mode, and the UE could responsively set itself to operate in the split-uplink mode and could operate accordingly. In the split-uplink mode, when the UE has user-plane data to transmit to the transport network, the UE could work with the 4G eNB 12 to coordinate uplink transmission of a portion of the data over the UE's 4G connection to the 4G eNB 12 for forwarding over an access bearer and output on the transport network, while the UE works with the 5G gNB 14 to coordinate uplink transmission of another portion of the data over the UE's 5G connection to the 5G gNB 14 for forwarding over an access bearer and output on the transport network.

In addition, when a UE operates in the split-uplink mode, the UE could be set to treat one of the UE's connections, such as the UE's 4G connection, as the UE's primary uplink path. This could involve the UE restricting the UE's uplink data flow to that connection until the level of the UE's uplink data flow rises to a threshold level or other reason exists to offload some of the data flow to the UE's other connection, e.g., the UE's 5G connection. Further, treating one of the UE's connections as the UE's primary uplink path could involve the UE providing a majority of the UE's uplink data flow on that connection when the UE will split the UE's uplink user-plane data flow between the UE's connections.

In line with the discussion above, the 4G eNB 12 could have two operational modes: (i) split-uplink-mode enabled mode, in which the 4G eNB 12 will allow the 4G eNB's EN-DC-connected served UE(s) to operate in the split-uplink mode (e.g., the 4G eNB 12 will allow new activation of split-uplink mode), and (ii) split-uplink-mode disabled mode, in which the 4G eNB 12 will not allow the 4G eNB's EN-DC-connected UE(s) to operate in the split-uplink mode (e.g., the 4G eNB 12 will not allow new activation of split-uplink mode).

From time to time, the 4G eNB 12 could dynamically set itself to operate in either one of these modes, such as by programmatically setting at the 4G eNB 12 a Boolean flag or the like that controls whether or not the 4G eNB 12 will allow the 4G eNB's EN-DC-connected served UEs to operate in the split-uplink mode.

As discussed above, the 4G eNB 12 could dynamically control whether the 4G eNB 12 will operate in the split-uplink mode enabled mode or rather the split-uplink-mode disabled mode, with the control being based on an evaluation of the quantity of UEs of various types that are currently connected with the 4G eNB 12.

In particular, as noted above, at issue could be how many UEs are respectively in each of the following groups: (A) UEs that are connected with the 4G eNB and that do not support the split-uplink mode, such as UEs that are connected with the 4G eNB 12 in a standalone-4G mode and are thus not EN-DC-connected, and UEs that are connected with the 4G eNB 12 as part of EN-DC but that do not support split-uplink mode, and (B) UEs that are connected with the 4G eNB 12 as part of EN-DC and that support split-uplink mode.

As to these groups, the 4G eNB 12 could regularly monitor how many UEs are in group A and how many UEs are in group B. To determine how many UEs are respectively in each of these groups, the 4G eNB 12 could consult its context records for each of its connected UEs. From those context records, the 4G eNB 12 could determine, for each of the 4G eNB's connected UEs whether the UE is currently EN-DC connected and, if so, whether the UE supports the split-uplink mode. The 4G eNB 12 could thereby count how many of the 4G eNB's connected UEs are in group A and how many of the 4G eNB's connected UEs are instead in group B.

On an ongoing basis, as the 4G eNB 12 determines these counts, the 4G eNB 12 could evaluate the counts in order to decide whether or not the 4G eNB 12 should operate with split-uplink mode enabled.

Without limitation, for instance, at issue could be whether or not there are threshold many UEs in the group A and threshold few UEs in group B.

In that case, if and when the 4G eNB 12 determines that the count of UEs in group A is threshold high and that the count of UEs in group B is threshold low (though perhaps not zero) then, based at least on that determination, the 4G eNB 12 could decide to operate with split-uplink mode disabled. Or if and when the 4G eNB 12 determines that the count of UEs in group A is threshold higher than the count of UEs in group B, then, based at least on that determination, the 4G eNB 12 could decide to operate with split-uplink mode disabled.

Whereas, if and when the 4G eNB 12 determines that the count of UEs in group A is not threshold high and/or that the count of UEs in group B is not threshold low, then, based at least on that determination, the 4G eNB 12 could decide to operate with split-uplink mode enabled. Or if and when the 4G eNB 12 determines that the count of UEs in group A is not threshold higher than the count of UEs in group B, then the 4G eNB 12 could decide to operate with split-uplink mode disabled.

In an example implementation, determining whether the count of UEs in group A is threshold high could involve determining whether the count of UEs in group A is at least as high as a predefined high threshold, where the predefined high threshold is set to a non-zero number that is deemed to be high. Further, determining whether the count of UEs in group B is threshold low could involve determining whether the count of UEs in group B is at least as low as a predefined low threshold, wherein the predefined low threshold is set to a non-zero number that is deemed to be low. Alternatively, there could be a single count threshold, and being greater than or equal to that threshold could constitute being threshold high, and being lower than that threshold could constitute being threshold low, among other possibilities.

Still further, determining whether the count of UEs in group A is threshold higher than the count of UEs in group B could involve determining whether the count of UEs in group A is at least a predefined threshold percentage or other delta higher than the quantity of UEs in group B, where the predefined threshold percentage or other delta is set to a non-zero value that is deemed high.

Further, in an example implementation, this process could apply specifically in a scenario where the 4G eNB 12 is configured to reserve a portion of the 4G eNB's uplink PRBs whenever the 4G eNB 12 has activated split-uplink mode for at least one EN-DC-connected UE, and particularly in a scenario where the 4G eNB 12 reserves a portion of the 4G eNB's uplink PRBs whenever at least one UE connected with the 4G eNB 12 as part of EN-DC is operating in the split-uplink mode. But the process could be carried out in other contexts or for other reasons as well.

In a situation where the 4G eNB 12 is currently operating with split-uplink mode enabled and decides to operate instead with split-uplink mode disabled, the 4G eNB 12 may reconfigure itself from allowing new activation of split-uplink mode to not allowing new activation of split-uplink mode. Further, if at the time the 4G eNB 12 makes this change the 4G eNB 12 is serving at least one EN-DC-connected UE that is operating in the split-uplink mode, the 4G eNB 12 could deactivate each such UE's split-uplink mode operation. For instance, the 4G eNB 12 could transmit to each such UE an RRC connection-reconfiguration message that carries an information-element value to which the UE is programmed to respond by the UE setting itself to not operate in the split-uplink mode. Further, if the 4G eNB 12 had reserved uplink resources to support split-uplink-mode service, the 4G eNB 12 may release that reservation.

Likewise, in a situation where the 4G eNB 12 is currently operating with split-uplink mode disabled and decides to operate instead with split-uplink mode enabled, the 4G eNB 12 may reconfigure itself from not allowing new activation of split-uplink mode to allowing new activation of split-uplink mode. And further, if at the time the 4G eNB 12 makes this change the 4G eNB 12 is serving at least one EN-DC-connected UE that supports the split-uplink mode but is not operating in the split-uplink mode, the 4G eNB 12 could activate each such UE's split-uplink mode operation. For instance, the 4G eNB 12 could transmit to each such UE an RRC connection-reconfiguration message that carries an information-element value to which the UE is programmed to respond by the UE setting itself to operate in the split-uplink mode. Further, the 4G eNB 12 may reserve uplink resources to support split-uplink-mode service.

Figure 2:
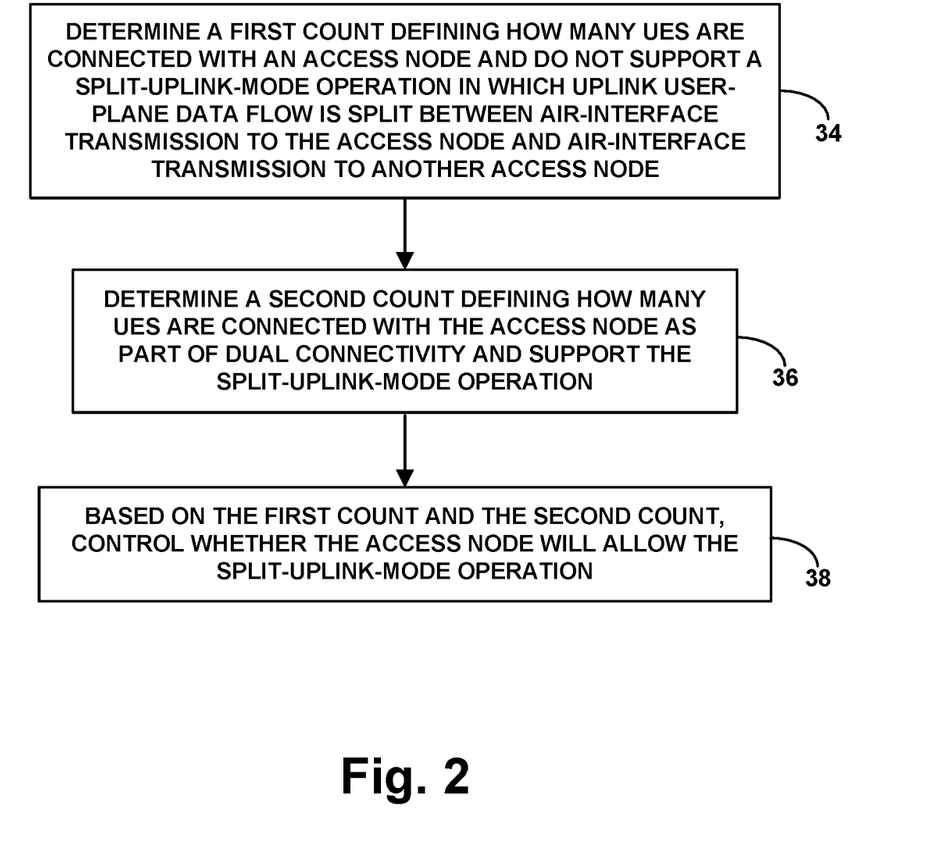
FIG. 2 is a flow chart depicting an example method in accordance with the present disclosure.

FIG. 2 is next a flow chart depicting an example method that could be carried out in accordance with the present disclosure, to control operation of an access node. As shown in FIG. 2, at block 34, the method includes determining a first count defining how many UEs are connected with the access node and do not support a split-uplink-mode operation in which uplink user-plane data flow is split between air-interface transmission to the access node and air-interface transmission to another access node. Further, at block 36, the method includes determining a second count defining how many UEs are connected with the access node as part of dual connectivity and support the split-uplink-mode operation. And at block 38, the method includes, based on the first count and the second count, controlling whether the access node will allow the split-uplink-mode operation.

In line with the discussion above, this method could be carried out by the access node. Alternatively, the method be carried out by another computing system, such as an element management system, which could determine the counts based on operational data records and could signal to the access node to direct and thus cause the access node to operate accordingly.

As discussed above, the access node could have a split-uplink-mode enabled mode in which the access node allows UE operation in the split-uplink mode (e.g., allowing new activation of the split-uplink mode), and the access node could have a split-uplink-mode disabled mode in which the access node does not allow UE operation in the split-uplink mode (e.g., does not allow new activation of the split-uplink mode). And in that case, the act of controlling, based on the first count and the second count, whether the access node will allow the split-uplink-mode operation could involve controlling, based on the first count and the second count, whether the access node operates in the split-uplink-mode enabled mode or rather in the split-uplink-mode disabled mode.

As further discussed above, the act of controlling, based on the first count and the second count, whether the access node operates in the split-uplink-mode enabled mode or rather in the split-uplink-mode disabled mode could involve (a) making a determination of whether both (i) the first count is threshold high and (ii) the second count is threshold low, (b) if the determination is affirmative, then, based at least on the determination, causing the access node to operate in the split-uplink-mode disabled mode, and (c) if the determination is negative, then, based at least on the determination, causing the access node to operate in the split-uplink-mode enabled mode.

In addition, as discussed above, the act of determining whether the first count is threshold high could involve determining whether the first count is at least as high as a predefined threshold. Further, the act of determining whether the second count is threshold low could involve determining whether the second count is at least as low as a predefined threshold. And still further, the act of making the determination of whether both the first count is threshold high and the second count is threshold low could involve determining whether the first count is threshold higher than the second count, such as whether the first count is at least a predefined threshold delta higher than the second count.

Yet further, as discussed above, the act of causing the access node to operate in the split-uplink-mode disabled mode could additionally be based on a determination that an uplink air interface of the access node is threshold highly loaded. For instance, at issue could be whether the uplink PRB utilization (e.g., percentage of total allocable uplink PRBs allocated per unit time) of the access node's air interface is at least as high as a predefined threshold level, among other possibilities.

Still further, as discussed above, the act of determining the first count of UEs defining how many UEs are connected with the access node and do not support a split-uplink-mode operation could involve determining how many UEs (i) have standalone connectivity with the access node or (i) are connected with the access node as part of dual connectivity but do not support the split-uplink-mode operation in the dual connectivity.

Figure 3:
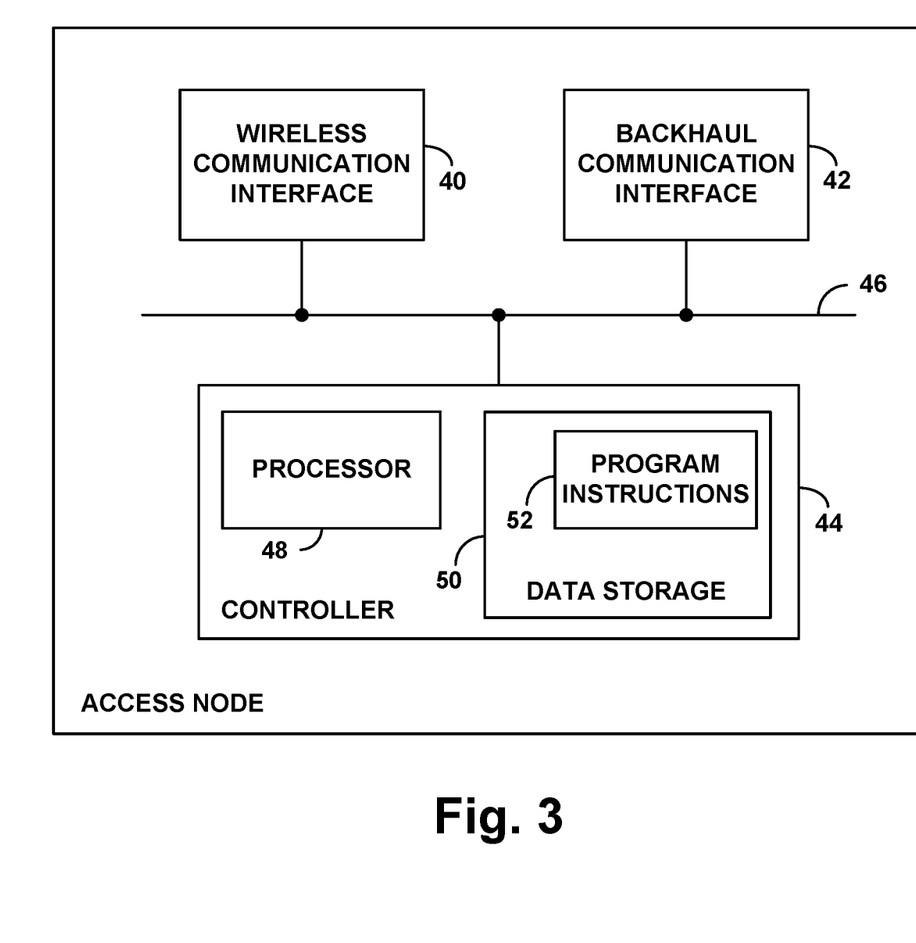
FIG. 3 is a simplified block diagram of an example access node operable in accordance with the present disclosure.

FIG. 3 is next a simplified block diagram of an example access node that could be operable in accordance with the present disclosure.

As shown in FIG. 3, the example access node includes at least one wireless communication interface 40, at least one backhaul communication interface 42, and at least one controller 44, all of which could be integrated together and/or communicatively linked together by a system bus, network, or other connection mechanism 46.

In an example implementation, the at least one wireless communication interface 40 could comprise an antenna structure, which could be tower mounted or could take other forms, and associated components such as a power amplifier and a wireless transceiver, so as to facilitate providing coverage on one or more carriers and serving the UE. And the at least one backhaul communication interface 42 could comprise network communication interface such as an Ethernet interface, through which the access node could engage in backhaul communication.

Further, the at least one controller 44 could comprise at least one processor 48 (e.g., one or more general purpose processors and/or one or more specialized processors) programmed to cause the access node to carry out various operations such as those discussed herein. For instance, the at least one controller 44 could comprise at least one non-transitory data storage 50 (e.g., one or more magnetic, optical, or flash storage components, necessarily non-transitory) which could store program instructions 52 executable by the at least one processor 48 to cause the access node to carry out such operations.

Various other features discussed herein can be implemented in this context as well, and vice versa.

Figure 4:
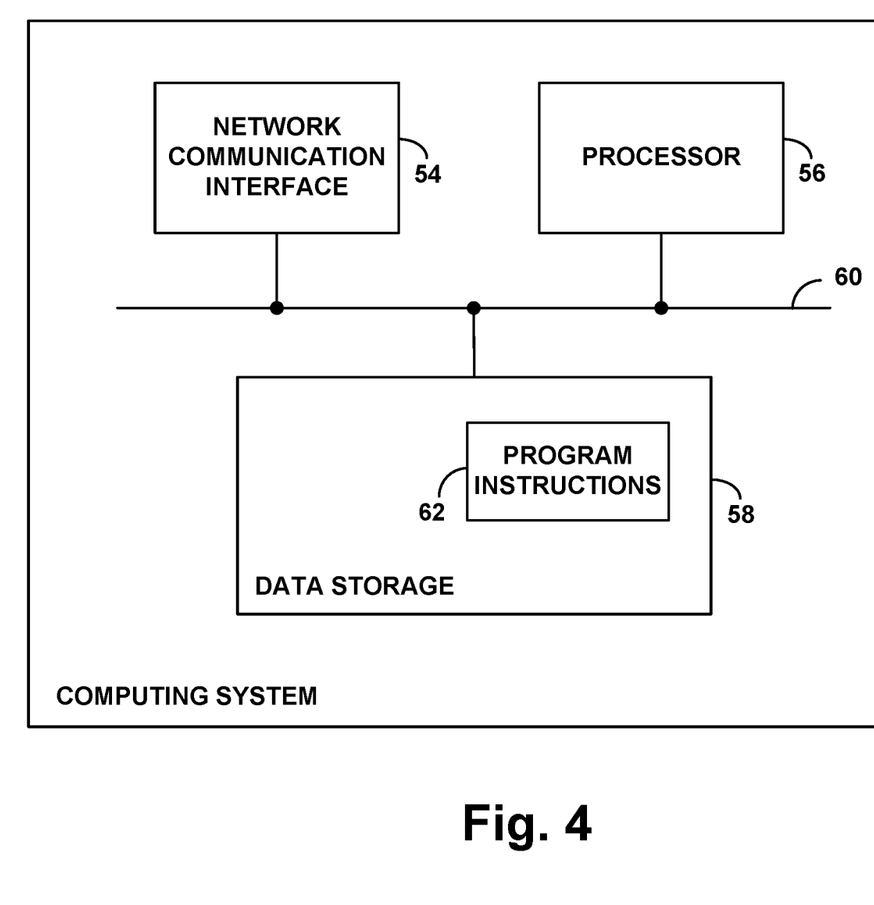
FIG. 4 is a simplified block diagram of an example computing system operable in accordance with the disclosure.

FIG. 4 is a simplified block diagram of an example computing system that could be operable in accordance with the present disclosure, to control whether an access node has split-uplink mode enabled or rather whether the access node has split-uplink mode disabled.

As shown in FIG. 4, the example computing system includes at least one network communication interface 54, at least one processor 56, and at least one non-transitory data storage 58, which could be integrated together and/or interconnected by a system bus, network, or other connection mechanism 60.

The at least one network communication interface 54 could comprise a physical network connector (e.g., an Ethernet interface) and associated communication logic (e.g., protocol stacks) to facilitate wired or wireless network communication with various other entities. The at least one processor 56 could comprise one or more general purpose processors (e.g., microprocessors) and/or one or more specialized processors (e.g., application specific integrated circuits). And the at least one non-transitory data storage 58 could comprise one or more volatile and/or non-volatile storage components (e.g., magnetic, optical, or flash storage, necessarily non-transitory).

As shown, the at least one non-transitory data storage 58 could then store program instructions 62. These program instructions could be executable by the at least one processor 56 to cause the computing system to carry out various operations described herein.

Various other features discussed herein can be implemented in this context as well, and vice versa.

Figure 5:
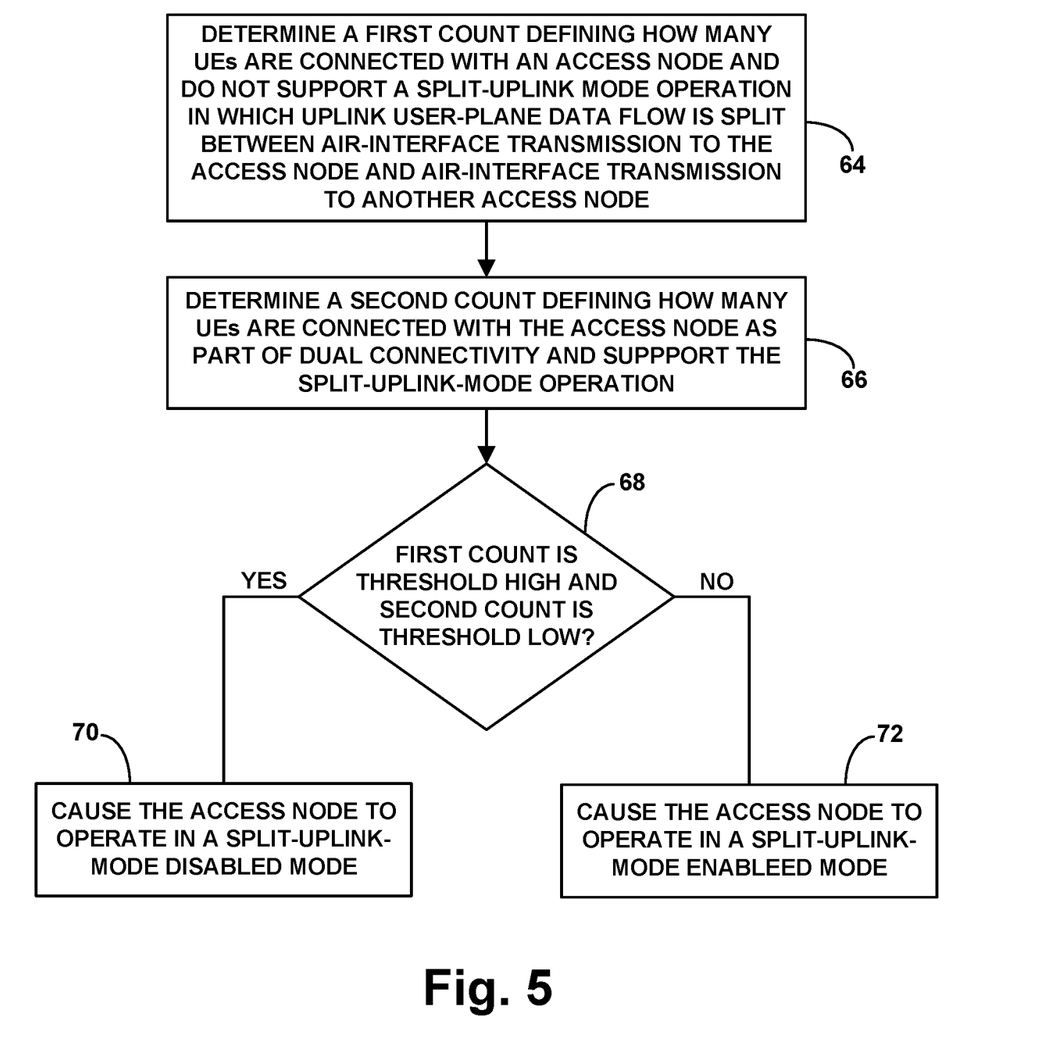
FIG. 5 is another flow chart depicting an example method in accordance with the disclosure.

FIG. 5 is another flow chart illustrating a method in line with the discussion above. As shown in FIG. 5, at block 64, the method includes determining the first count, and at block 66, the method includes determining the second count. At block 68, the method then includes making a determination of whether the first count is threshold high and the second count is threshold low. At block 70, if the determination is affirmative, then, based at least in part on the determination, the method includes causing the access node to operate in the split-uplink-mode disabled mode. Whereas, at block 72, if the determination is negative, then, based at least in part on the determination, the method includes causing the access node to operate in the split-uplink-mode enabled mode.

The present disclosure also contemplates at least one non-transitory computer-readable medium having stored thereon (e.g., being encoded with) program instructions executable by at least one processor to carry out various operations described above.

Exemplary embodiments have been described above. Those skilled in the art will understand, however, that changes and modifications may be made to these embodiments without departing from the true scope and spirit of the invention.

What is claimed is:

1. A method for controlling operation of an access node, the method comprising:
    determining a first count defining how many user equipment devices (UEs) are connected with the access node and do not support a split-uplink-mode operation in which uplink user-plane data flow is split between air-interface transmission to the access node and air-interface transmission to another access node;
    determining a second count defining how many UEs are connected with the access node as part of dual connectivity and support the split-uplink-mode operation;
    controlling, based on the first count and the second count, whether the access node will allow the split-uplink-mode operation.

2. The method of claim 1, wherein the method is carried out by the access node.

3. The method of claim 1, wherein the access node has a split-uplink-mode enabled mode in which the access node allows UE operation in the split-uplink mode, and the access node has a split-uplink-mode disabled mode in which the access node does not allow UE operation in the split-uplink mode, and wherein controlling, based on the first count and the second count, whether the access node will allow the split-uplink-mode operation comprises:
    controlling, based on the first count and the second count, whether the access node operates in the split-uplink-mode enabled mode or rather in the split-uplink-mode disabled mode.

4. The method of claim 3, wherein controlling, based on the first count and the second count, whether the access node operates in the split-uplink-mode enabled mode or rather in the split-uplink-mode disabled mode comprises:
    making a determination of whether both (i) the first count is threshold high and (ii) the second count is threshold low;
    if the determination is affirmative, then, based at least on the determination, causing the access node to operate in the split-uplink-mode disabled mode; and
    if the determination is negative, then, based at least on the determination, causing the access node to operate in the split-uplink-mode enabled mode.

5. The method of claim 4, wherein determining whether the first count is threshold high comprises determining whether the first count is at least as high as a predefined threshold.

6. The method of claim 4, wherein determining whether the second count is threshold low comprises determining whether the second count is at least as low as a predefined threshold.

7. The method of claim 4, wherein making the determination of whether both (i) the first count is threshold high and (ii) the second count is threshold low comprises determining whether the first count is threshold higher than the second count.

8. The method of claim 7, wherein determining whether the first count is threshold higher than the second count comprises determining whether the first count is at least a predefined threshold delta higher than the second count.

9. The method of claim 4, wherein causing the access node to operate in the split-uplink-mode disabled mode is additionally based on a determination that an uplink air interface of the access node is threshold highly loaded.

10. The method of claim 1, wherein the first count defines how many UEs either (i) have standalone connectivity with the access node or (i) are connected with the access node as part of dual connectivity but do not support the split-uplink-mode operation in the dual connectivity.

11. An access node comprising:
    at least one wireless communication interface including an antenna structure through which to serve user equipment devices (UEs);
    at least one backhaul communication interface through which to engage in backhaul communication; and
    at least one controller, wherein the at least one controller is configured to cause the access node to carry out operations including:
        determining a first count defining how many UEs are connected with the access node and do not support a split-uplink-mode operation in which uplink user-plane data flow is split between air-interface transmission to the access node and air-interface transmission to another access node,
        determining a second count defining how many UEs are connected with the access node as part of dual connectivity and support the split-uplink-mode operation, and
        controlling, based on the first count and the second count, whether the access node will allow the split-uplink-mode operation.

12. The access node of claim 11, wherein the at least one controller comprises at least one processor, at least one non-transitory data storage, and program instructions stored in the at least one non-transitory data storage and executable by the at least one processor to cause the access node to carry out the operations.

13. The access node of claim 11, wherein the access node has a split-uplink-mode enabled mode in which the access node allows UE operation in the split-uplink mode, and the access node has a split-uplink-mode disabled mode in which the access node does not allow UE operation in the split-uplink mode, and wherein controlling, based on the first count and the second count, whether the access node will allow the split-uplink-mode operation comprises:
controlling, based on the first count and the second count, whether the access node operates in the split-uplink-mode enabled mode or rather in the split-uplink-mode disabled mode.

14. The access node of claim 13, wherein controlling, based on the first count and the second count, whether the access node operates in the split-uplink-mode enabled mode or rather in the split-uplink-mode disabled mode comprises:
making a determination of whether both (i) the first count is threshold high and (ii) the second count is threshold low;
if the determination is affirmative, then, based at least on the determination, causing the access node to operate in the split-uplink-mode disabled mode; and
if the determination is negative, then, based at least on the determination, causing the access node to operate in the split-uplink-mode enabled mode.

15. The access node of claim 14, wherein making the determination of whether both (i) the first count is threshold high and (ii) the second count is threshold low comprises determining whether the first count is threshold higher than the second count.

16. The access node of claim 14, wherein causing the access node to operate in the split-uplink-mode disabled mode is additionally based on a determination that an uplink air interface of the access node is threshold highly loaded.

17. The access node of claim 11, wherein the first count defines how many UEs either (i) have standalone connectivity with the access node or (i) are connected with the access node as part of dual connectivity but do not support the split-uplink-mode operation in the dual connectivity.

18. A non-transitory computer-readable medium containing instructions executable by at least one processor to carry out operations comprising:
determining a first count defining how many UEs are connected with an access node and do not support a split-uplink-mode operation in which uplink user-plane data flow is split between air-interface transmission to the access node and air-interface transmission to another access node,
determining a second count defining how many UEs are connected with the access node as part of dual connectivity and support the split-uplink-mode operation, and
controlling, based on the first count and the second count, whether the access node will allow the split-uplink-mode operation.

19. The non-transitory computer-readable medium of claim 18,
wherein the access node has a split-uplink-mode enabled mode in which the access node allows UE operation in the split-uplink mode, and the access node has a split-uplink-mode disabled mode in which the access node does not allow UE operation in the split-uplink mode, and wherein controlling, based on the first count and the second count, whether the access node will allow the split-uplink-mode operation comprises:
making a determination of whether both (i) the first count is threshold high and (ii) the second count is threshold low;
if the determination is affirmative, then, based at least on the determination, causing the access node to operate in the split-uplink-mode disabled mode; and
if the determination is negative, then, based at least on the determination, causing the access node to operate in the split-uplink-mode enabled mode.

20. The non-transitory computer-readable medium of claim 19, wherein causing the access node to operate in the split-uplink-mode disabled mode is additionally based on a determination that an uplink air interface of the access node is threshold highly loaded.

* * * * *